United States Patent
Konishiike et al.

(10) Patent No.: US 8,048,563 B2
(45) Date of Patent: Nov. 1, 2011

(54) ANODE, BATTERY, AND METHODS OF MANUFACTURING THEM

(75) Inventors: Isamu Konishiike, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 11/552,434

(22) Filed: Oct. 24, 2006

(65) Prior Publication Data

US 2007/0092797 A1    Apr. 26, 2007

(30) Foreign Application Priority Data

Oct. 25, 2005    (JP) ................... 2005-309997

(51) Int. Cl.
    *H01M 4/02*    (2006.01)
(52) U.S. Cl. ............... 429/218.1; 429/209; 252/182.1
(58) Field of Classification Search .................. None
    See application file for complete search history.

(56) References Cited

U.S. PATENT DOCUMENTS

| | | | | |
|---|---|---|---|---|
| 5,529,859 A * | 6/1996 | Shu et al. | ...................... | 429/331 |
| 6,051,340 A | 4/2000 | Kawakami et al. | | |
| 6,432,579 B1 | 8/2002 | Tsuji et al. | | |
| 2004/0142242 A1 * | 7/2004 | Kawase et al. | ................. | 429/245 |
| 2005/0118503 A1 * | 6/2005 | Honda et al. | ............... | 429/218.1 |

FOREIGN PATENT DOCUMENTS

| | | |
|---|---|---|
| JP | 8-50922 | 2/1996 |
| JP | 11-135115 | 5/1999 |
| JP | 2948205 | 7/1999 |
| JP | 2004-349162 | 12/2004 |
| JP | 2005-183364 | 7/2005 |
| JP | 2005-209496 | 8/2005 |
| JP | 2005-235734 | 9/2005 |

OTHER PUBLICATIONS

Japanese Office Action issued on Jul. 14, 2009, for corresponding Japanese Patent Application JP 2005-309997.

* cited by examiner

*Primary Examiner* — Cynthia Lee
(74) *Attorney, Agent, or Firm* — K&L Gates LLP

(57) ABSTRACT

A battery using the anode, and methods of manufacturing the anode and the battery are provided. The battery is capable of relaxing stress while securing the contact characteristics between an anode current collector and an anode active material layer, and capable of improving the characteristics. The anode active material layer containing Si as an element is provided on the anode current collector. The anode active material layer includes a first anode active material layer having a first particle formed by being grown on the anode current collector by vapor-phase deposition method and a second anode active material layer having a second particle with an average particle diameter ranging from 0.2 μm to 20 μm which is deposited on the first anode active material layer by coating the first anode active material layer with the second particles.

13 Claims, 6 Drawing Sheets

ANODE, BATTERY, AND METHODS OF MANUFACTURING THEM

CROSS REFERENCES TO RELATED APPLICATIONS

The present application claims priority to Japanese Patent Application JP 2005-309997 filed in the Japanese Patent Office on Oct. 25, 2005, the entire contents of which being incorporated herein by reference.

BACKGROUND

The present application relates to an anode containing silicon (Si) as an element, a battery using the anode, and methods of manufacturing the anode and the battery.

In recent years, as mobile devices have become more sophisticated and multi-functionalized, a higher capacity of secondary batteries as a power source for these mobile devices has been demanded. As a secondary battery to meet such a demand, there is a lithium ion secondary battery. However, since graphite is currently used for the anode in the lithium ion secondary battery, the battery capacity thereof is in a saturated state and thus it is difficult to attain a significantly high capacity. Therefore, silicon or the like has been considered for the anode. However, when silicon powder is used for the anode, the silicon powder is largely expanded, shrunk, and pulverized due to charge and discharge. Thus, the current collectivity is lowered, the increased surface area promotes decomposition reaction of the electrolytic solution, and the cycle characteristics are extremely poor. Therefore, recently, forming an anode active material layer containing silicon by vapor-phase deposition method or the like has been reported (for example, refer to Japanese Unexamined Patent Application Publication Nos. 8-50922 and 11-135115, and Japanese Patent Publication No. 2948205). When the anode active material layer is formed by a vapor-phase deposition method, pulverization can be prevented, and the anode current collector and the anode active material layer can be integrated. In the result, electron conductivity in the anode becomes extremely favorable, and high performance both in the capacity and the cycle life is expected.

However, when the anode active material layer is formed by a vapor-phase deposition method, expansion and shrinkage due to charge and discharge generates stress. Therefore, such stress deforms the anode and destroys the active material. Further, in vapor-phase deposition method, it takes a long time to form the anode active material layer compared to coating the anode current collector with a powder active material. Thus, the productivity is not favorable. Furthermore, in the case of vapor-phase deposition method, when deposition time is long, influence of heat on the anode current collector becomes large, and thus the characteristics are lowered and handling becomes difficult.

In view of the foregoing, it is desirable to provide an anode capable of relaxing stress while securing contact characteristics between an anode current collector and an anode active material layer, and for improving the characteristics, a battery using the anode, and methods of manufacturing the anode and the battery.

SUMMARY

According to an embodiment, there is provided an anode with an anode active material layer on an anode current collector, wherein the anode active material layer includes: a first anode active material layer having a plurality of first particles formed by being grown on the anode current collector; and a second anode active material layer having a plurality of second particles deposited on the first anode active material layer. The first particle and the second particle contain silicon as an element, and an average particle diameter of the second particle ranges from 0.2 μm to 20 μm.

According to an embodiment of the invention, there is provided a battery including a cathode, an anode, and an electrolyte, wherein the anode includes an anode current collector, a first anode active material layer having a plurality of first particles formed by being grown on the anode current collector, and a second anode active material layer having a plurality of second particles deposited on the first anode active material layer. The first particle and the second particle contain silicon as an element, and an average particle diameter of the second particle ranges from 0.2 μm to 20 μm.

According to an embodiment, there is provided a method of manufacturing an anode including forming a first anode active material layer by growing a plurality of first particles containing silicon as an element on an anode current collector; and forming a second anode active material layer by depositing a plurality of second particles containing silicon as an element with an average particle diameter of 0.2 μm to 20 μm on the first anode active material layer.

According to an embodiment, there is provided a method of manufacturing a battery including a cathode, an anode, and an electrolyte, the method including forming a first anode active material layer by growing a plurality of first particles containing silicon as an element on an anode current collector; and forming a second anode active material layer by depositing a plurality of second particles containing silicon as an element with an average particle diameter ranging from 0.2 μm to 20 μm on the first anode active material layer are included.

According to the anode and the battery of the embodiment, the first anode active material layer having the first particle formed by being grown on the anode current collector is provided. Therefore, the contact characteristics between the anode current collector and the anode active material layer can be improved. Further, the second anode active material layer having the second particle with an average particle diameter ranging from 0.2 μm to 20 μm deposited on the first anode active material layer is provided. Therefore, stress due to expansion and shrinkage can be relaxed, and influence of heat on the anode current collector in manufacturing can be reduced. In the result, the battery characteristics such as a capacity and cycle characteristics can be improved. In addition, manufacturing time can be shortened, and productivity can be improved.

In particular, when the first particle further contains oxygen (O) as an element, and the average oxygen content in the first anode active material layer is from 3 atomic % to 40 atomic %, the contact characteristics between the anode current collector and the anode active material layer can be further improved, and stress due to expansion and shrinkage can be further relaxed.

Further, when the thickness of the first anode active material layer is from 10 nm to 15 μm, improved effects can be obtained.

Further, according to the method of manufacturing an anode and the method of manufacturing a battery of the embodiment, the method includes forming the first anode active material layer by growing the first particle on the anode current collector and forming the second anode active material layer by depositing the second particle with an average particle diameter of 0.2 μm to 20 μm on the first anode active material layer. Therefore, the anode and the battery according to the embodiment can be easily manufactured.

Other and further objects, features and advantages of the invention will appear more fully from the following description.

Additional features and advantages are described herein, and will be apparent from, the following Detailed Description and the figures.

DETAILED DESCRIPTION

An embodiment will be hereinafter described in detail with reference to the drawings.

Figure 1:
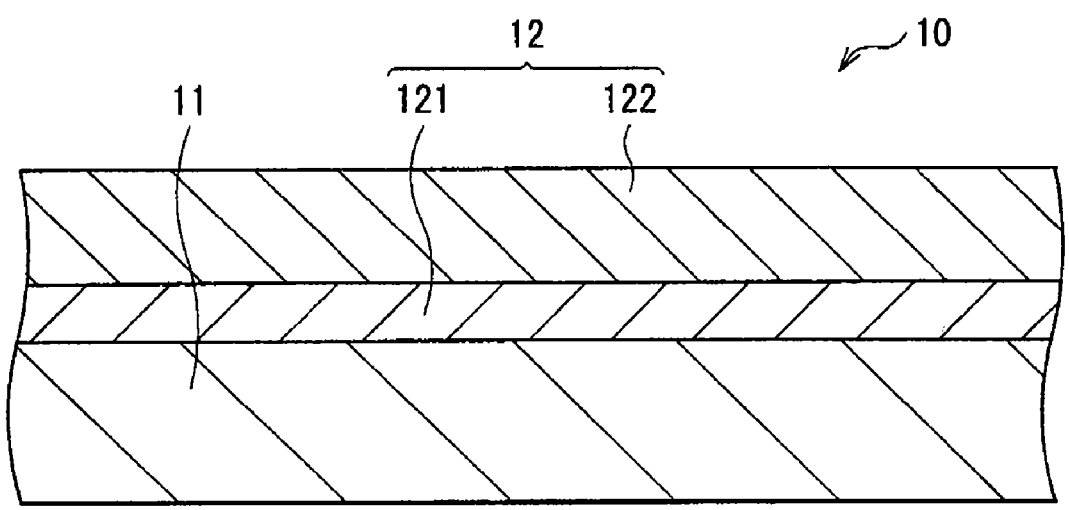
FIG. 1 is a cross section showing a structure of an anode according to an embodiment.

FIG. 1 shows a structure of an anode 10 according to an embodiment. For example, the anode 10 has a structure that an anode active material layer 12 containing silicon as an element is provided on an anode current collector 11. Silicon has a high ability to insert and extract lithium, and can provide a high energy density. Silicon may be contained in the form of a simple substance, an alloy, or a compound. While FIG. 1 shows a case that the anode active material layer 12 is provided on one face of the anode current collector 11, the anode active material layer 12 may be provided on the both faces of the anode current collector 11.

The anode current collector 11 is preferably made of a metal material containing a metal element not forming an intermetallic compound with lithium (Li). When an intermetallic compound is formed with lithium, the anode is expanded and shrunk due to charge and discharge, structural deformation occurs, and current collectivity is lowered. In addition, the ability to support the anode active material layer 12 is lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper (Cu), nickel (Ni), titanium (Ti), iron (Fe), or chromium (Cr) can be cited.

Specially, a metal material containing a metal element being alloyed with the anode active material layer 12 is preferable. Thereby, the contact characteristics between the anode current collector 11 and the anode active material layer 12 can be improved. As a metal element not forming an intermetallic compound with lithium and being alloyed with the anode active material layer 12, that is, as a metal element not forming an intermetallic compound with lithium and being alloyed with silicon, for example, copper, nickel, or iron can be cited. The anode current collector 11 may be made of a single layer or a plurality of layers. In the latter case, the layer contacting with the anode active material layer 12 may be made of a metal material being alloyed with silicon, and other layers may be made of other metal material.

The surface roughness of the anode current collector 11 on which the anode active material layer 12 is provided is, based on ten point height of roughness profile Rz described in JIS B0601, preferably 1 µm or more, more preferably 9 µm or less, and much more preferably in the range from 1.3 µm to 3.5 µm. Thereby, contact characteristics with the anode active material layer 12 can be improved. The surface roughness of the anode current collector 11 may be adjusted by roughening the surface by lapping, for example. Otherwise, the surface roughness of the anode current collector 11 may be adjusted by forming granular protrusions by plating, vapor deposition or the like. Providing the protrusions on the surface is preferable, since thereby higher effects can be obtained. While the protrusions are preferably made of a material containing copper as an element, the protrusions may be made of other material.

Figure 2:
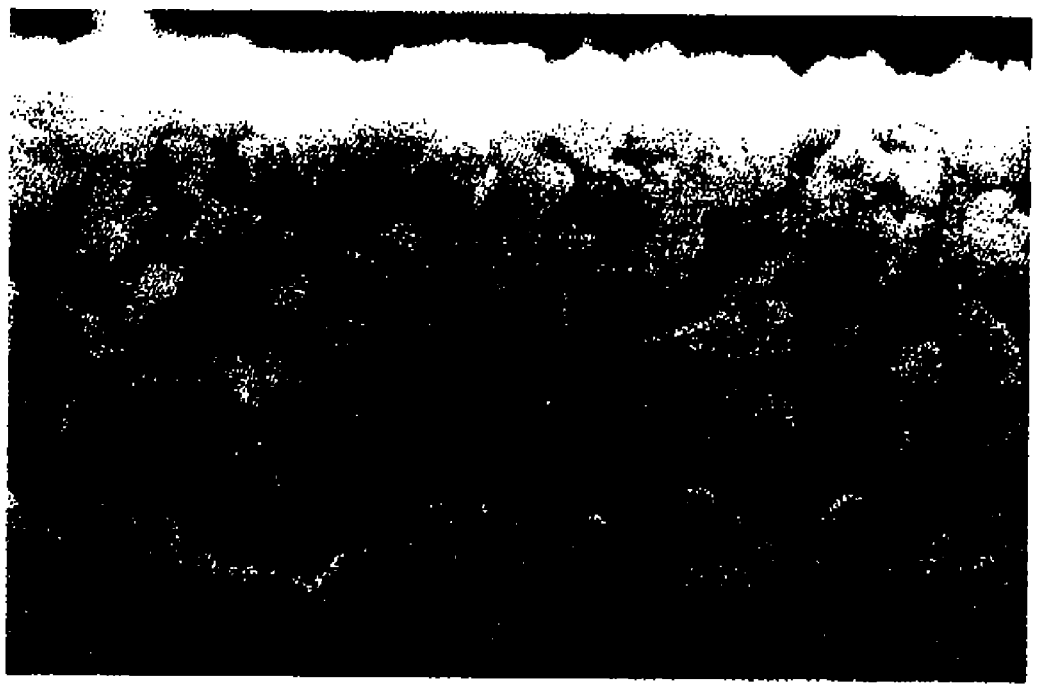
FIG. 2 is an SEM photograph showing a particle structure of an anode active material layer shown in FIG. 1.
Figure 3:
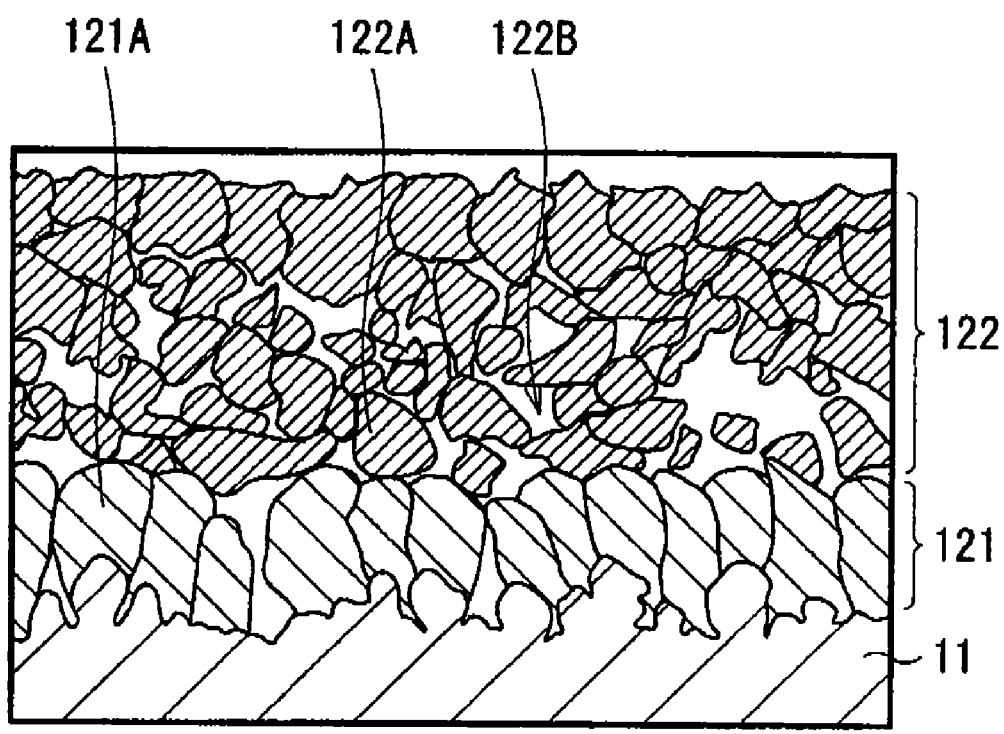
FIG. 3 is a view for explaining the SEM photograph shown in FIG. 2.

The anode active material layer 12 has a first anode active material layer 121 provided on the anode current collector 11 and a second anode active material layer 122 provided on the anode current collector 11 with the first anode active material layer 121 in between. FIG. 2 is a Scanning Electron Microscope (SEM) photograph showing a particle structure of the anode active material layer 12. FIG. 3 is a drawing for explaining FIG. 2.

The first anode active material layer 121 has a plurality of first particles 121A formed by being grown on the anode current collector 11. The first particle 121A contains silicon as an element, and is formed by, for example,—vapor-phase deposition method. Thereby, in the anode 10, the contact characteristics between the anode current collector 11 and the anode active material layer 12 can be improved. Further, the first particle 121A preferably further contains oxygen as an element. The average oxygen content in the first anode active material layer 121 is preferably from 3 atomic % to 40 atomic %. Thereby, the contact characteristics with the anode current collector 11 can be further improved. In addition, the first anode active material layer 121 can be prevented from being expanded and shrunk, and thus stress can be reduced. Oxygen may be bonded to silicon, but is not necessarily bonded to silicon.

The average oxygen content in the first anode active material layer 121 is obtained by, for example, as described below. A cross section of the anode active material layer 12 is cut out by, for example, Focused Ion Beam (FIB). The composition in the thickness direction of the anode active material layer 12 is measured for a given number of plurality of locations by line analysis of the cross section using Auger Electron Spectroscopy (AES). An average of the results is regarded as an average oxygen content. The number of measurements is preferably large. For example, five locations or more selected at random are preferably measured, and ten locations or more selected at random are more preferably measured.

The interface between the first anode active material layer 121 and the anode current collector 11 is, for example, a boundary where the silicon content and the content of a metal element of the anode current collector 11 are reversed. That is, the first anode active material layer 121 starts from the location where the silicon content becomes larger than the content of the metal element of the anode current collector 11. Similarly, the interface between the first anode active material layer 121 and the second anode active material layer 122 is, for example, a boundary where the silicon content and the content of elements other than silicon are reversed. That is, the first anode active material layer 121 ends at the location just before the location where the silicon content becomes smaller than the content of other elements. It is often the case that a coating is formed in the interface between the first anode active material layer 121 and the second anode active material layer 122. Further, in the interface thereof, voids may exist, or other components such as a binder may exist. When the average oxygen content is calculated, locations where cracks exist in the first anode active material layer 121 are excluded from calculation. The foregoing method of determining the interface between the first anode active material layer 121 and the anode current collector 11, or the interface between the first anode active material layer 121 and the second anode active material layer 122 is only an example. Such an interface may be determined by observing cross sections with an SEM or the like at the same time.

The first anode active material layer 121 is preferably alloyed with the anode current collector 11 in at least part of the interface with the anode current collector 11. Specifically, in the interface, the element of the anode current collector 11 is preferably diffused in the first anode active material layer 121, or the element of the first anode active material layer 121 is preferably diffused in the anode current collector 11, or the both thereof are preferably diffused in each other. Thereby, the contact characteristics can be further improved. In this application, the foregoing diffusion of elements is regarded as one form of alloying.

The thickness of the first anode active material layer 121 is preferably from 10 nm to 15 μm. In this range, improved effects can be obtained.

The second anode active material layer 122 has a plurality of second particles 122A deposited on the first anode active material layer 121. The second particle 122A contains silicon as an element, and the average particle diameter is from 0.2 μm to 20 μm. The second anode active material layer 122 is formed by depositing the second particle 122A by coating the first anode active material layer 121 with a coating material containing the second particle 122A. If necessary, the coating material may contain other materials such as a binder and an electrical conductor. Thereby, the second anode active material layer 122 has more voids 122B among the second particles 122A than the first anode active material layer 121. Thus, stress due to expansion and shrinkage can be relaxed.

The anode 10 can be manufactured, for example, as described below. First, the anode current collector 11 made of a metal foil is prepared. The first anode active material layer 121 is formed on the anode current collector 11 by growing the first particle 121A by vapor-phase deposition method. As vapor-phase deposition method, for example, physical deposition method or chemical deposition method can be used. Specifically, vacuum vapor deposition method, sputtering method, ion plating method, laser ablation method, CVD (Chemical Vapor Deposition) method or the like can be cited. Then, for example, by introducing oxygen in the atmosphere, oxygen is added to the first anode active material layer 121.

Next, the second anode active material layer 122 is formed on the first anode active material layer 121 by coating the first anode active material layer 121 with a coating material containing the second particle 122A. If necessary, the coating material may be added with a binder, an electrical conductor, a disperse medium or the like in addition to the second particle 122A. For example, when a coating material containing a mixture of the second particle 122A, a binder, and a disperse medium is used, after the first anode active material layer 121 is coated with the coating material, the disperse medium is removed by being volatilized. If necessary, the resultant is pressure-formed, and thereby the second anode active material layer 122 is formed. Therefore, compared to vapor-phase deposition method, formation time is shortened in this method. Further, influence of heat on the anode current collector 11 becomes small.

After that, heat treatment is preferably performed under the vacuum atmosphere or under the non-oxidizing atmosphere, if necessary. In some cases, the first anode active material layer 121 and the current collector 11 are alloyed concurrently when the first anode active material layer 121 is formed. However, heat treatment accelerates alloying. Further, heat treatment improves the contact characteristics of the second particle 122A in the second anode active material layer 122, and the characteristics can be improved. Thereby, the anode 10 shown in FIG. 1 is obtained.

Figure 4:
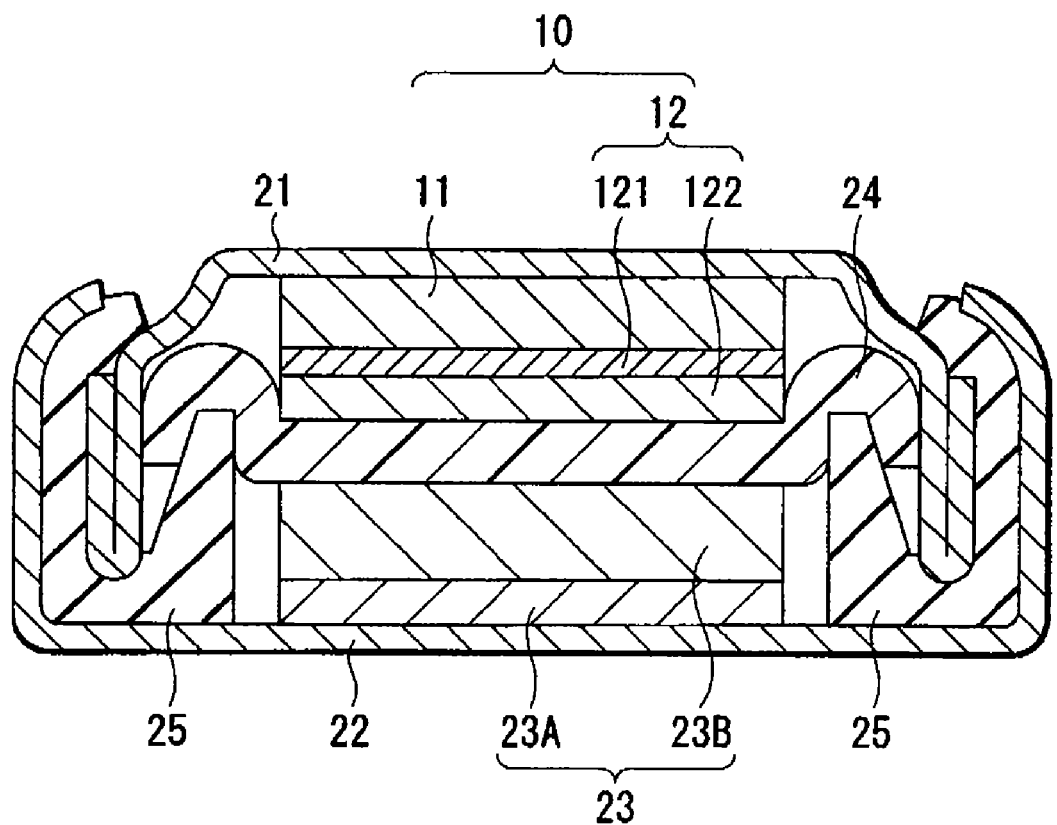
FIG. 4 is a cross section showing a structure of a secondary battery using the anode shown in FIG. 1.

The anode 10 is used for the secondary battery as follows, for example. FIG. 4 shows a structure of the secondary battery. The secondary battery is a so-called coin-type secondary battery in which the anode 10 contained in a package cup 21 and a cathode 23 contained in a package can 22 are layered with a separator 24 in between.

Peripheral edges of the package cup 21 and the package can 22 are hermetically sealed by being caulked with an insulating gasket 25. The package cup 21 and the package can 22 are respectively made of a metal such as stainless and aluminum.

The cathode 23 has, for example, a cathode current collector 23A and a cathode active material layer 23B provided on the cathode current collector 23A. Arrangement is made so that the cathode active material layer 23B side is opposed to the anode active material layer 12. The cathode current collector 23A is made of, for example, aluminum, nickel, and stainless.

The cathode active material layer 23B contains, for example, as a cathode active material, one or more cathode materials capable of inserting and extracting lithium. The cathode active material layer 23B may contain an electrical conductor such as a carbon material and a binder such as polyvinylidene fluoride according to needs. As a cathode material capable of inserting and extracting lithium, for example, a lithium-containing metal complex oxide expressed by a general formula, $Li_xMIO_2$ is preferable, since thereby a high voltage can be generated and a high energy density can be obtained, and thus a higher capacity of the secondary battery can be obtained. MI represents one or more transition metals, and is, for example, preferably at least one of cobalt and nickel. x varies according to charge and discharge states of the battery, and is generally in the range of $0.05 \leq x \leq 1.10$. As a specific example of such a lithium-containing metal complex oxide, $LiCoO_2$, $LiNiO_2$ or the like can be cited.

The cathode 23 can be formed as follows, for example. A mixture is prepared by mixing a cathode active material, an electrical conductor, and a binder. The mixture is dispersed in a disperse medium to form mixture slurry. The cathode current collector 23A made of a metal foil is coated with the mixture slurry, which is dried and compression-molded to form the cathode active material layer 23B.

The separator 24 separates the anode 10 from the cathode 23, prevents current short circuit due to contact of the both electrodes, and lets through lithium ions. The separator 24 is made of, for example, polyethylene or polypropylene.

An electrolytic solution which is a liquid electrolyte is impregnated in the separator 24. The electrolytic solution contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, ethyl methyl carbonate, 1,3-dioxole-2-one, 4-vinyl-1,3-dioxolane- 2-one, and an ester carbonate derivative having halogen atom can be cited. Specially, at least one of 1,3-dioxole-2-one and 4-vinyl-1,3-dioxolane-2-one is preferably used, since thereby decomposition reaction of the electrolytic solution can be prevented. The ester carbonate derivative having halogen atom is also preferably used, since thereby decomposition reaction of the electrolytic solution can be prevented.

The ester carbonate derivative having halogen atom may be a cyclic compound or a chain compound. However, the cyclic compound is preferable, since thereby higher effects can be obtained. As such a cyclic compound, 4-fluoro-1,3-dioxolane-2-one, 4-chloro-1,3-dioxolane-2-one, 4-bromo-1,3-dioxolane-2-one, 4,5-difluoro-1,3-dioxolane-2-one or the like can be cited. Specifically, 4-fluoro-1,3-dioxolane-2-one is preferable, since thereby higher effects can be obtained.

One of the solvents may be used singly, or a mixture of two or more solvents may be used. For example, in the case of the ester carbonate derivative having halogen atom, one thereof may be used singly, or a mixture of two or more ester carbonate derivatives having halogen atom may be used. Otherwise, it is possible to use a mixture of the ester carbonate derivative having halogen atom and one or more other solvents. 1,3-dioxole-2-one or 4-vinyl-1,3-dioxolane-2-one is preferably used by being mixed with other one or more solvents.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be manufactured by, for example, layering the anode 10, the separator 24 impregnated with an electrolytic solution, and the cathode 23, inserting the lamination between the package cup 21 and the package can 22, and caulking the package cup 21 and the package can 22.

In the secondary battery, when charged, for example, lithium ions are extracted from the cathode 23 and inserted in the anode 10 through the electrolytic solution. When discharged, for example, lithium ions are extracted from the anode 10 and inserted in the cathode 23 through the electrolytic solution. In this embodiment, the contact characteristics between the anode current collector 11 and the anode active material layer 12 are improved by the first anode active material layer 121. Further, stress due to expansion and shrinkage is relaxed by the second anode active material layer 122. Therefore, even if the anode active material layer 12 is extremely expanded and shrunk due to charge and discharge, high cycle characteristics can be obtained.

Figure 5:
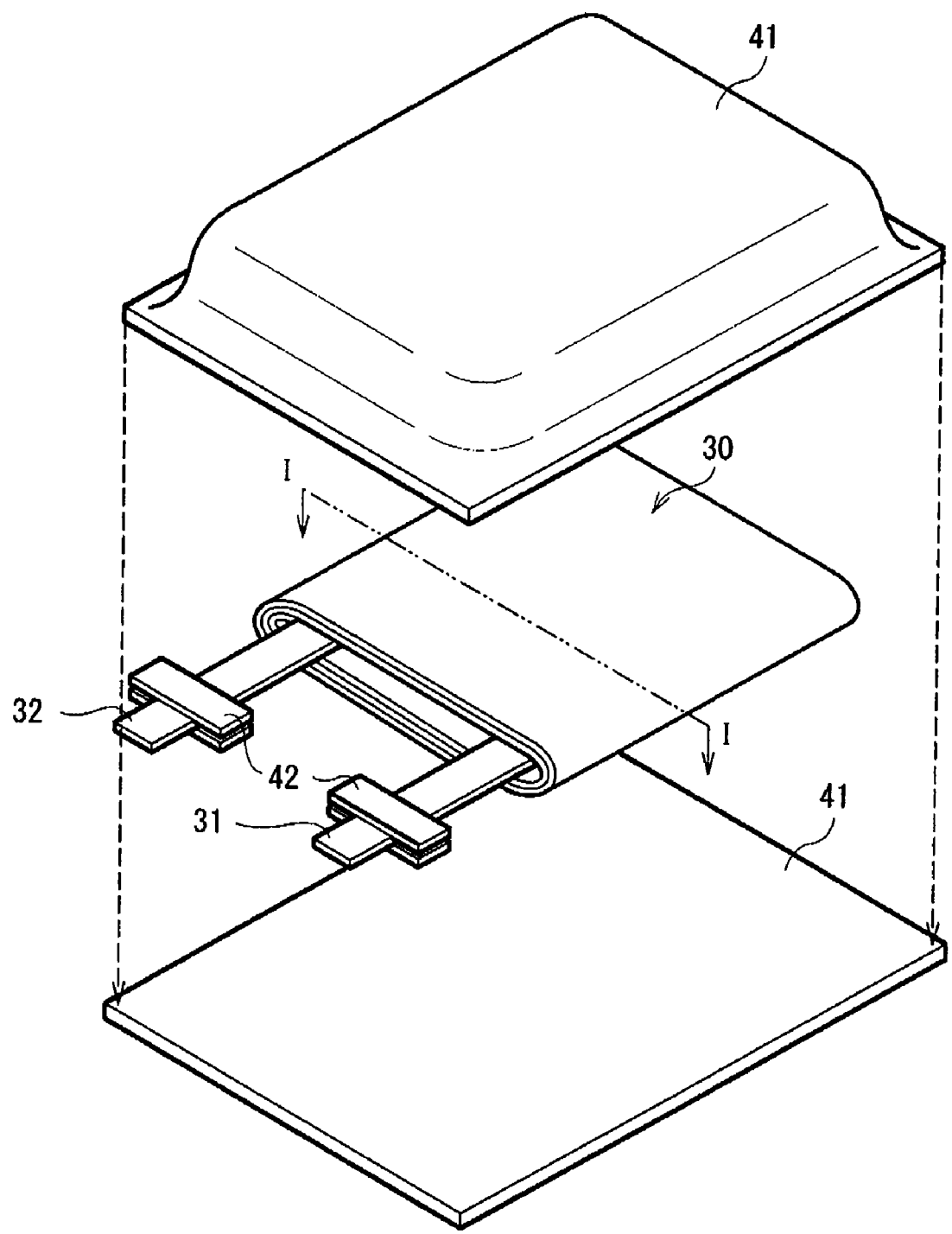
FIG. 5 is an exploded perspective view showing another structure of a secondary battery using the anode shown in FIG. 1.

The anode 10 according to this embodiment may be used for the following secondary battery. FIG. 5 shows a structure of the secondary battery. In the secondary battery, a spirally wound electrode body 30 on which leads 31 and 32 are attached is contained inside a film package member 41. Thereby, a small, light, and thin secondary battery can be obtained. The leads 31 and 32 are respectively directed from inside to outside of the package member 41 and derived in the same direction, for example. The leads 31 and 32 are respectively made of, for example, a metal material such as aluminum, copper, nickel, and stainless, and are in a state of a thin plate or mesh, respectively.

The package member 41 is made of a rectangular aluminum laminated film in which, for example, a nylon film, an aluminum foil, and a polyethylene film are bonded together in this order. The package member 41 is, for example, arranged so that the polyethylene film side and the spirally wound electrode body 30 are opposed to each other, and the respective outer edges are contacted to each other by fusion bonding or an adhesive. Adhesive films 42 to protect from entering of outside air are inserted between the package member 41 and the leads 31 and 32. The adhesive film 42 is made of a material having contact characteristics to the leads 31 and 32, for example, a polyolefin resin such as polyethylene, polypropylene, modified polyethylene, and modified polypropylene.

The package member 41 may be made of a laminated film having other structure, a polymer film such as polypropylene, or a metal film, instead of the foregoing aluminum laminated film.

Figure 6:
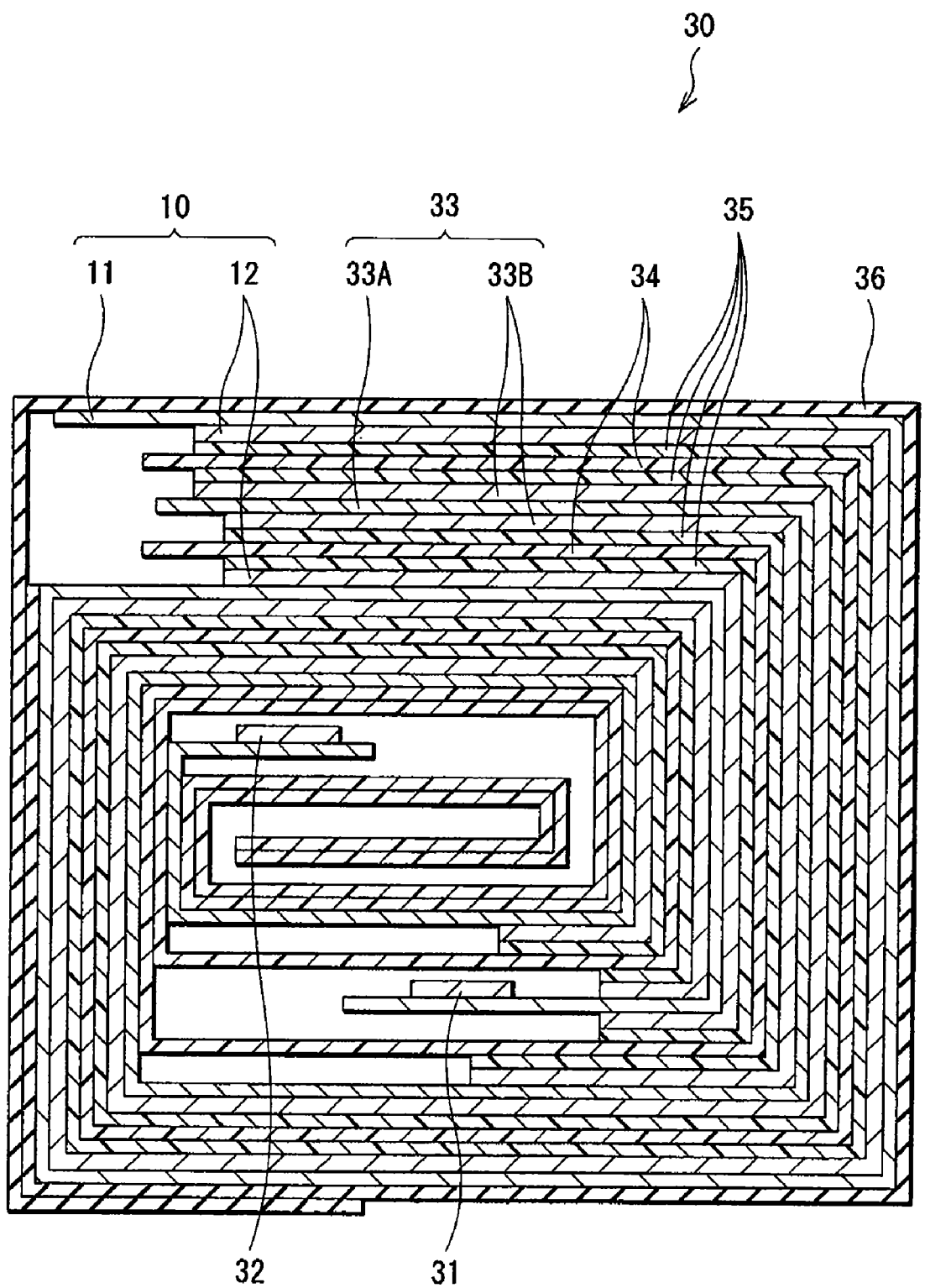
FIG. 6 is a cross section showing a structure taken along line I-I of the secondary battery shown in FIG. 5.

FIG. 6 shows a cross sectional structure taken along line I-I of the spirally wound electrode body 30 shown in FIG. 5. In the spirally wound electrode body 30, the anode 10 and a cathode 33 are layered and spirally wound with a separator 34 and an electrolyte layer 35 in between. The outermost periphery thereof is protected by a protective tape 36.

The anode 10 has a structure in which the anode active material layer 12 is provided on the both faces of the anode current collector 11. The cathode 33 also has a structure in which a cathode active material layer 33B is provided on the both faces of a cathode current collector 33A. Arrangement is made so that the cathode active material layer 33B is opposed to the anode active material layer 12. The structures of the cathode current collector 33A, the cathode active material layer 33B, and the separator 34 are similar to those of the cathode current collector 23A, the cathode active material layer 23B, and the separator 24 respectively described above.

The electrolyte layer 35 is made of a so-called gelatinous or gel electrolyte in which an electrolytic solution is held in a holding body composed of a polymer. The gelatinous electrolyte is preferable, since a high ion conductivity can be thereby obtained, and leakage of the battery can be thereby prevented. The composition of the electrolytic solution is similar to that of the coin-type secondary battery shown in FIG. 4. As a polymer material, for example, polyvinylidene fluoride can be cited.

The secondary battery can be manufactured, for example, as follows. First, the electrolyte layer 35 in which an electrolytic solution is held in a holding body is formed on the anode 10 and the cathode 33, respectively. After that, the leads 31 and 32 are attached thereto. Next, the anode 10 and the cathode 33 formed with the electrolyte layer 35 are layered and spirally wound with the separator 34 in between. The protective tape 36 is adhered to the outermost periphery thereof to form the spirally wound electrode body 30. Subsequently, for example, the spirally wound electrode body 30 is sandwiched between the package members 41, and outer edges of the package members 41 are contacted by thermal fusion bonding or the like to enclose the spirally wound electrode body 30. The adhesive films 42 are inserted between the leads 31 and 32 and the package member 41. Thereby, the secondary battery shown in FIG. 5 and FIG. 6 is completed.

Otherwise, the secondary battery may be manufactured as follows. First, the leads 31 and 32 are respectively attached to the anode 10 and the cathode 33. After that, the anode 10 and the cathode 33 are layered and spirally wound with the separator 34 in between. The protective tape 36 is adhered to the outermost periphery thereof, and a spirally wound body as a precursor of the spirally wound electrode body 30 is formed. Next, the spirally wound body is sandwiched between the package members 41, and the outermost peripheries except for one side are thermally fusion-bonded to obtain a pouched state. After that, an electrolytic composition containing an electrolytic solution, a monomer as a raw material for a polymer, a polymerization initiator, and if necessary other material such as a polymerization inhibitor is injected into the package member 41. Subsequently, the opening of the package member 41 is thermally fusion-bonded and hermetically sealed in the vacuum atmosphere. Then, the resultant is heated to polymerize the monomer to obtain a polymer. Thereby, the gelatinous electrolyte layer 35 is formed. In the result, the secondary battery shown in FIG. 5 and FIG. 6 is completed.

The operation of the secondary battery is similar to that of the coin-type secondary battery shown in FIG. 4.

As above, according to this embodiment, the first anode active material layer 121 having the first particle 121A formed by being grown on the anode current collector 11 is provided. Therefore, the contact characteristics between the anode current collector 11 and the anode active material layer 12 can be improved. Further, the second anode active material layer 122 having the second particle 122A deposited on the first anode active material layer 121 is provided. Therefore, stress due to expansion and shrinkage can be relaxed, and influence of heat on the anode current collector 11 in manufacturing can be small. In the result, the battery characteristics such as a capacity and cycle characteristics can be improved. In addition, manufacturing time can be shortened, and productivity can be improved.

In particular, when the first particle 121A further contains oxygen as an element, and the average oxygen content in the first anode active material layer 121 is from 3 atomic % to 40 atomic %, the contact characteristics between the anode current collector 11 and the anode active material layer 12 can be more improved, and stress due to expansion and shrinkage can be more relaxed.

Further, when the thickness of the first anode active material layer 121 is from 10 nm to 15 μm, improved effects can be obtained.

Further, according to this embodiment, the step of depositing the first anode active material layer 121 by growing the first particle 121A on the anode current collector 11 and the step of forming the second anode active material layer 122 by depositing the second particle 122A on the first anode active material layer 121 are included. Therefore, the anode 10 according to this embodiment and the battery using it can be easily manufactured.

EXAMPLES

Further, specific examples of the invention will be hereinafter described in detail with reference to the drawings.

Examples 1-1 to 1-4

The laminated-film secondary battery shown in FIGS. 5 and 6 was fabricated. First, the first particle 121A containing silicon was grown on the anode current collector 11 made of a copper foil being 18 μm thick, with a surface roughness Rz of 2 μm by electron-beam deposition method, and thereby the first anode active material layer 121 was formed. At this time, oxygen gas was introduced in the atmosphere, and thus oxygen was added to the first anode active material layer 121. Next, 90 parts by weight of silicon powder as the second particle 122A, 10 parts by weight of polyvinylidene fluoride as a binder were mixed. A resultant mixture was added with a disperse medium to form slurry coating material. The average particle diameter of the silicon powder was changed to 0.2 μm in Example 1-1, 2 μm in Example 1-2, 15 μm in Example 1-3, and 20 μm in Example 1-4. Subsequently, the first anode active material layer 121 was coated with the coating material, which was dried to remove the disperse medium, and then pressed to form the second anode active material layer 122. Thereby, the anode 10 was formed.

Further, 92 parts by weight of lithium cobaltate ($LiCoO_2$) powder being 5 μm in an average particle diameter as a cathode active material, 3 parts by weight of carbon black as an electrical conductor, and 5 parts by weight of polyvinylidene fluoride as a binder were mixed. A resultant mixture was added with a disperse medium to obtain slurry. Next, the cathode current collector 33A made of an aluminum foil was coated with the slurry, which was dried and pressed to form the cathode active material layer 33B. Thereby, the cathode 33 was formed.

Next, 37.5 wt % of ethylene carbonate, 37.5 wt % of propylene carbonate, 10 wt % of 1,3-dioxole-2-one, and 15 wt % of $LiPF_6$ were mixed to prepare an electrolytic solution. Both faces of the anode 10 and the cathode 33 were respectively coated with a mixture obtained by mixing the electrolytic solution and polyvinylidene fluoride as a block copolymer with weight average molecular weight of 0.6 million to form the electrolyte layer 35. Subsequently, the leads 31 and 32 were attached, the anode 10 and the cathode 33 were layered and spirally wound with the separator 34 in between, and the resultant body was enclosed in the package member 41 made of an aluminum laminated film. Thereby, the secondary batteries of Examples 1-1 to 1-4 were obtained.

As Comparative example 1-1 relative to Examples 1-1 to 1-4, a secondary battery was fabricated in the same manner as in Examples 1-1 to 1-4, except that the first anode active material layer 121 was not deposited, and the second anode active material layer 122 was directly formed on the anode current collector 11. Further, Comparative examples 1-2 and 1-3, secondary batteries were fabricated in the same manner as in Examples 1-1 to 1-4, except that the average particle diameter of the second particle 122A used for forming the second anode active material layer 122 was 0.1 μm or 25 μm.

For each fabricated secondary battery of Examples 1-1 to 1-4 and Comparative examples 1-1 to 1-3, charge and discharge test was performed at 25° C., and the capacity retention ratio at the 101st cycle to the second cycle was obtained. Then, charge was performed until the battery voltage reached 4.2 V at a constant current density of 1 $mA/cm^2$, and then performed until the current density reached 0.05 $mA/cm^2$ at a constant voltage of 4.2 V. Discharge was performed until the battery voltage reached 2.5 V at a constant current density of 1 $mA/cm^2$. Charge was performed so that a utility ratio of the capacity of the anode 10 became 80% to prevent metal lithium from being precipitated on the anode 10. The capacity retention ratio was calculated as a ratio of the discharge capacity at the 101st cycle to the discharge capacity at the second cycle, that is, as (the discharge capacity at the 101st cycle/the discharge capacity at the second cycle)×100. The obtained results are shown in Table 1.

Further, for the fabricated secondary batteries of Examples 1-1 to 1-4 and Comparative examples 1-2 and 1-3, the secondary batteries were disassembled after the 1st cycle of charge and discharge was performed. The anode 10 was taken out, washed with dimethyl carbonate, and dried. Then, a cross section of the anode 10 was cut out by Focused Ion Beam (FIB). After that, for the cut-out cross section, the average oxygen content in the first anode active material layer 121 was measured by line analysis of Auger Electron Spectroscopy (AES). Oxygen contents of 5 locations selected at random were measured, and the average value therefrom was calculated as an average oxygen content. Further, the thickness of the first anode active material layer 121 and the thickness of the second anode active material layer 122 were measured by SEM. The results thereof are shown in Table 1 together.

TABLE 1

| | First anode active material layer | | Second anode active material layer | | |
|---|---|---|---|---|---|
| | Thickness (μm) | Average oxygen concentration (atomic %) | Thickness (μm) | Average particle diameter of second particle (μm) | Capacity retention ratio (%) |
| Example 1-1 | 3 | 4.0 | 25 | 0.2 | 73 |
| Example 1-2 | | 3.2 | | 2 | 75 |
| Example 1-3 | | 3.6 | | 15 | 71 |
| Example 1-4 | | 3.4 | | 20 | 70 |
| Comparative example 1-1 | — | — | 30 | 2 | 47 |
| Comparative example 1-2 | 3 | 3.5 | 25 | 0.1 | 49 |
| Comparative example 1-3 | | 3.4 | | 25 | 48 |

As shown in Table 1, according to Examples 1-1 to 1-4 in which the first anode active material layer 121 was formed and the average particle diameter of the second particle 122A was from 0.2 μm to 20 μm, the capacity retention ratio could be largely improved compared to Comparative example 1-1 in which the first anode active material layer 121 was not formed. Meanwhile, in Comparative example 1-2 in which the average particle diameter of the second particle was smaller than 0.2 μm and in Comparative example 1-3 in which the average particle diameter of the second particle was larger than 20 μm, the capacity retention ratio was almost similar to that of Comparative example 1-1.

That is, it was found that when the first anode active material layer 121 was formed by growing the first particle 121A on the anode current collector 11 and the second anode active material layer 122 was formed by depositing the second particle 122A with the average particle diameter of 0.2 μm to 20 μm on the first anode active material layer 121, the cycle characteristics could be improved.

Examples 2-1 to 2-9

Secondary batteries were fabricated in the same manner as in Example 1-2, except that the average oxygen content in the first anode active material layer 121 was changed by changing the amount of oxygen gas introduced when the first anode active material layer 121 was formed. For the fabricated secondary batteries of Examples 2-1 to 2-9, charge and discharge were performed in the same manner as in Example 1-2, and the capacity retention ratio was obtained. Further, the average oxygen content of the first anode active material layer 121, the thickness of the first anode active material layer 121, and the thickness of the second anode active material layer 122 were measured in the same manner as in Example 1-2. The results thereof are shown in Table 2 together with the results of Example 1-2 and Comparative examples 1-1 to 1-3.

TABLE 2

| | First anode active material layer | | Second anode active material layer | | |
|---|---|---|---|---|---|
| | Thickness (μm) | Average oxygen concentration (atomic %) | Thickness (μm) | Average particle diameter of second particle (μm) | Capacity retention ratio (%) |
| Example 2-1 | 3 | 0.7 | 25 | 2 | 64 |
| Example 2-2 | | 2.6 | | | 67 |
| Example 1-2 | | 3.2 | | | 75 |
| Example 2-3 | | 5.5 | | | 77 |
| Example 2-4 | | 8.3 | | | 77 |
| Example 2-5 | | 15.4 | | | 80 |
| Example 2-6 | | 20.1 | | | 79 |
| Example 2-7 | | 30.0 | | | 77 |
| Example 2-8 | | 39.2 | | | 73 |
| Example 2-9 | | 40.9 | | | 69 |
| Comparative example 1-1 | — | — | 30 | 2 | 47 |
| Comparative example 1-2 | 3 | 3.5 | 25 | 0.1 | 49 |
| Comparative example 1-3 | | 3.4 | | 25 | 48 |

As shown in Table 2, the following tendency was shown. When the average oxygen content of the first anode active material layer 121 was increased, the capacity retention ratio was improved, showed the maximum value, and then was decreased. That is, it was found that when the average oxygen content of the first anode active material layer 121 was from 3 atomic % to 40 atomic %, the cycle characteristics could be further improved.

Examples 3-1 to 3-7

Secondary batteries were fabricated in the same manner as in Example 1-2, except that the thickness of the first anode active material layer 121 and the thickness of the second anode active material layer 122 were changed. For the fabricated secondary batteries of Examples 3-1 to 3-7, charge and discharge were performed in the same manner as in Example 1-2, and the capacity retention ratio was obtained. Further, the average oxygen content of the first anode active material layer 121, the thickness of the first anode active material layer 121, and the thickness of the second anode active material layer 122 were measured in the same manner as in Example 1-2. The results thereof are shown in Table 3 together with the results of Example 1-2 and Comparative example 1-1.

it was found that when the thickness of the first anode active material layer 121 was from 0.01 μm to 15 μm, the cycle characteristics could be further improved.

Example 4-1

A secondary battery was fabricated in the same manner as in Example 1-2, except that heat treatment was performed for 10 hours at 300 deg C. after the first anode active material layer 121 and the second anode active material layer 122 were formed. For the fabricated secondary battery of Example 4-1, charge and discharge were performed in the same manner as in Example 1-2, and the capacity retention ratio was obtained. Further, the average oxygen content of the first anode active material layer 121, the thickness of the first anode active material layer 121, and the thickness of the second anode active material layer 122 were measured. The results thereof are shown in Table 4 together with the results of Example 1-2 and Example 2-3.

TABLE 3

|  | First anode active material layer | | Second anode active material layer | | Capacity retention ratio (%) |
| --- | --- | --- | --- | --- | --- |
|  | Thickness (μm) | Average oxygen concentration (atomic %) | Thickness (μm) | Average particle diameter of second particle (μm) |  |
| Example 3-1 | 0.01 | 3.9 | 30 | 2 | 72 |
| Example 3-2 | 0.2 | 3.6 | 30 |  | 73 |
| Example 3-3 | 1 | 3.2 | 27 |  | 75 |
| Example 1-2 | 3 | 3.2 | 25 |  | 75 |
| Example 3-4 | 6 | 3.8 | 21 |  | 74 |
| Example 3-5 | 9 | 3.1 | 15 |  | 72 |
| Example 3-6 | 12 | 3.6 | 12 |  | 70 |
| Example 3-7 | 15 | 3.3 | 6 |  | 70 |
| Comparative example 1-1 | — | — | 30 | 2 | 47 |

As shown in Table 3, the following tendency was shown. When the thickness of the first anode active material layer 121 was increased, the capacity retention ratio was improved, showed the maximum value, and then was decreased. That is,

TABLE 4

|  | First anode active material layer | | Second anode active material layer | | Heat treatment | Capacity retention ratio (%) |
| --- | --- | --- | --- | --- | --- | --- |
|  | Thickness (μm) | Average oxygen concentration (atomic %) | Thickness (μm) | Average particle diameter of second particle (μm) |  |  |
| Example 1-2 | 3 | 3.2 | 25 | 2 | N/A | 75 |
| Example 2-3 |  | 5.5 |  |  |  | 77 |
| Example 4-1 |  | 4.5 |  |  | Applicable | 84 |

As shown in Table 4, according to Example 4-1, the cycle characteristics could be improved more than in Examples 1-2 and 2-3. That is, it was found that when heat treatment was provided, the cycle characteristics could be further improved.

Examples 5-1 and 5-2

Secondary batteries were fabricated in the same manner as in Example 1-2, except that an electrolytic solution mixed with 10 wt % of 4-fluoro-1,3-dioxolane-2-one was used instead of 10 wt % of 1,3-dioxole-2-one in Examples 5-1 and 5-2, and further heat treatment was performed for 10 hours at 300 deg C. after the first anode active material layer 121 and the second anode active material layer 122 were formed in Example 5-2. For the fabricated secondary batteries of Examples 5-1 and 5-2, charge and discharge were performed in the same manner as in Example 1-2, and the capacity retention ratio was obtained. Further, the average oxygen content of the first anode active material layer 121, the thickness of the first anode active material layer 121, and the thickness of the second anode active material layer 122 were measured in the same manner as in Example 1-2. The results thereof are shown in Table 5 together with the results of Examples 1-2, 2-3, and 4-1.

TABLE 5

| | First anode active material layer | | Second anode active material layer | | | | |
|---|---|---|---|---|---|---|---|
| | Thickness ($\mu$m) | Average oxygen concentration (atomic %) | Thickness ($\mu$m) | Average particle diameter of second particle ($\mu$m) | Heat treatment | Electrolytic solution FEC | Capacity retention ratio (%) |
| Example 1-2 | 3 | 3.2 | 25 | 2 | N/A | Not added | 75 |
| Example 2-3 | | 5.5 | | | | | 77 |
| Example 4-1 | | 4.5 | | | Applicable | | 84 |
| Example 5-1 | | 4.2 | | | N/A | Added | 84 |
| Example 5-2 | | 4.8 | | | Applicable | | 89 |

As shown in Table 5, according to Examples 5-1 and 5-2, the cycle characteristics could be improved more than in Example 1-2, 2-3, or 4-1. That is, it was found that when 4-fluoro-1,3-dioxolane-2-one was used as an electrolytic solution, the cycle characteristics could be further improved.

It should be appreciated that the invention is not limited to the foregoing embodiments and examples, and various modifications may be made. For example, in the foregoing embodiments and examples, descriptions have been given of the case using the electrolytic solution as a liquid electrolyte or the gelatinous electrolyte. However, other electrolytes may be used. As far as other electrolytes are concerned, a solid electrolyte having ion conductivity, a mixture of a solid electrolyte and an electrolytic solution, or a mixture of a solid electrolyte and a gelatinous electrolyte can be used, for example.

As a solid electrolyte, for example, a polymer solid electrolyte in which an electrolyte salt is dispersed in a polymer having ion conductivity, or an inorganic solid electrolyte composed of ion conductive glass, ionic crystal or the like can be used. As a polymer of the polymer solid electrolyte, for example, an ether polymer such as polyethylene oxide and a cross-linked body containing polyethylene oxide, an ester polymer such as poly methacrylate, or an acrylate polymer can be used singly, by mixing, or by copolymerization. As an inorganic solid electrolyte, a substance containing lithium nitride, lithium phosphate or the like can be used.

Further, in the foregoing embodiments and examples, descriptions have been given of the coin type secondary battery and the spirally wound laminated type secondary battery. However, the invention can be similarly applied to a secondary battery having a different shape such as a cylinder type secondary battery, a square type secondary battery, a button type secondary battery, a thin secondary battery, a large secondary battery, and a laminated type secondary battery. Further, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode having an anode active material layer formed on an anode current collector, wherein the anode active material layer comprises:
    a first anode active material layer having a plurality of first particles formed by being grown on the anode current collector by a vapor phase deposition method; and
    a second anode active material layer having a plurality of second particles deposited on the first anode active material layer by coating,
    wherein the first particle and the second particle comprise silicon as an element,
    wherein an average particle diameter of the second particle ranges from 0.2 $\mu$m to 20 $\mu$m, and wherein a thickness of the first anode active material layer ranges from 10 nm to 15 $\mu$m, and
    wherein the second anode active material layer includes a binder.

2. The anode according to claim 1, wherein the first particle further comprises oxygen as an element, and an average oxygen content in the first anode active material layer ranges from 3 atomic % to 40 atomic %.

3. The anode according to claim 1, wherein the first anode active material layer is alloyed with the anode current collector in at least part of the interface with the anode current collector.

4. A battery comprising:
a cathode;
an anode;
and an electrolyte,
wherein the anode includes
an anode current collector,
a first anode active material layer having a plurality of first particles formed by being grown on the anode current collector by a vapor phase method, and
a second anode active material layer having a plurality of second particles deposited on the first anode active material layer by coating,
wherein the first particles and the second particles comprise silicon as an element, and
wherein an average particle diameter of the second particle range from 0.2 µm to 20 µm, and wherein a thickness of the first anode active material layer ranges from 10 nm to 15 µm, and
wherein the second anode active material layer includes a binder.

5. The battery according to claim 4, wherein the first particles further comprise oxygen as an element, and an average oxygen content in the first anode active material layer ranges from 3 atomic % to 40 atomic %.

6. The battery according to claim 4, wherein the first anode active material layer is alloyed with the anode current collector in at least part of the interface with the anode current collector.

7. The battery according to claim 4, wherein the electrolyte contains an ester carbonate derivative including a halogen atom.

8. The anode of claim 1, wherein the average particle diameter of the second particle ranges from 0.2 µm to 2 µm.

9. The battery of claim 4, wherein the average particle diameter of the second particle ranges from 0.2 µm to 2 µm.

10. The anode of claim 1, wherein the first and second anode active material layers are heat treated.

11. The battery of claim 4, wherein the first and second anode active material layers are heat treated.

12. The anode of claim 1, wherein the second anode active material layer comprises an electrical conductor.

13. The battery of claim 4, wherein the second anode active material layer comprises an electrical conductor.

* * * * *